United States Patent [19]

Menzel

[11] Patent Number: 4,687,690
[45] Date of Patent: Aug. 18, 1987

[54] METHOD OF AND MEANS FOR FORMING AND SEALING HELICALLY WOUND TUBES

[75] Inventor: Stanley W. O. Menzel, Burnside, Australia

[73] Assignee: Rib Loc Hong Kong Limited, Hong Kong

[21] Appl. No.: 796,570

[22] PCT Filed: Jan. 22, 1985

[86] PCT No.: PCT/AU85/00009
 § 371 Date: Oct. 10, 1985
 § 102(e) Date: Oct. 10, 1985

[87] PCT Pub. No.: WO85/03755
 PCT Pub. Date: Aug. 29, 1985

[30] Foreign Application Priority Data
 Feb. 20, 1984 [NZ] New Zealand ............ 207,219

[51] Int. Cl.⁴ .................................................. F16L 9/16
[52] U.S. Cl. ......................................... 428/36; 428/122; 138/122; 138/154
[58] Field of Search ........................... 428/33, 36, 122; 138/122, 154

[56] References Cited

U.S. PATENT DOCUMENTS

| | | | |
|---|---|---|---|
| 2,739,089 | 3/1956 | Hageltorn | 154/43 |
| 3,199,541 | 8/1965 | Richitelli et al. | 138/129 |
| 3,815,639 | 6/1974 | Westerbarkey | 138/122 |
| 4,119,123 | 10/1978 | Samuels | 138/122 |
| 4,209,043 | 6/1980 | Menzel | 138/122 |
| 4,224,965 | 9/1980 | Suchor | 138/122 |
| 4,435,460 | 3/1984 | Menzel | 138/122 |
| 4,471,813 | 9/1984 | Cothran | 138/122 |
| 4,566,496 | 1/1986 | Menzel | 138/122 |

OTHER PUBLICATIONS

PCT Publication WO82/01757 to Johns-Manville Corporation.

*Primary Examiner*—John E. Kittle
*Assistant Examiner*—James J. Seidleck

[57] ABSTRACT

A strip adapted to form a tube by helically winding and having a series of longitudinal ribs upstanding from a base on the strip and transversely spaced thereon in which one rib has a bulbous end portion and another has a bulbous longitudinal socket to form interengaging means when helically wound, all or some ribs optionally defining a hollow whereby limited lateral stretch at the join and ribs is permitted. The hollow can be closed by a flap. In various embodiments the ribs take a number of forms. In most cases all ribs are hollow and of substantially rectangular or semicylindrical shape to give a corrugated external form. A panel formed by winding a strip to helical form and splitting the strip longitudinally and straightening it at least partially to form a draining wall is also described.

19 Claims, 12 Drawing Figures

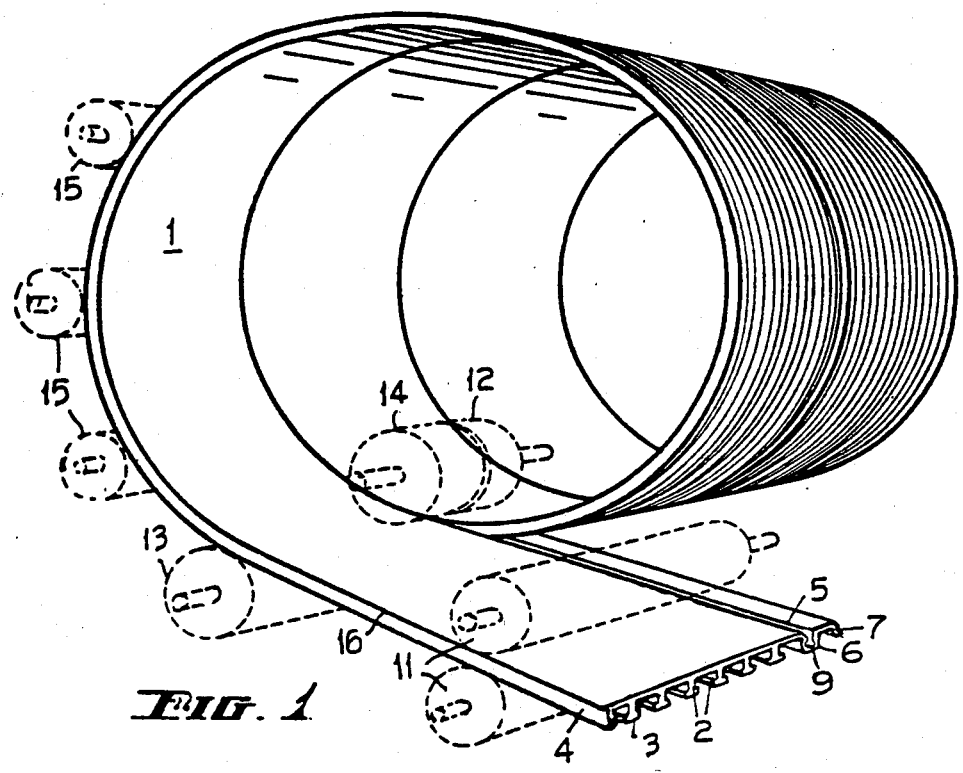

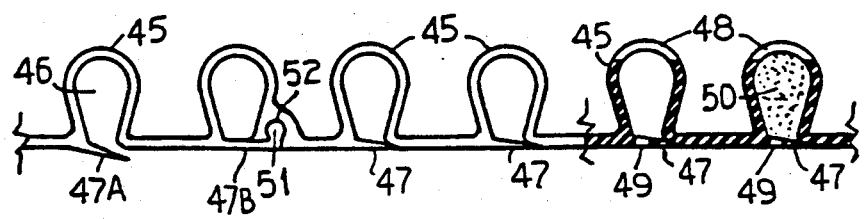
FIG. 7
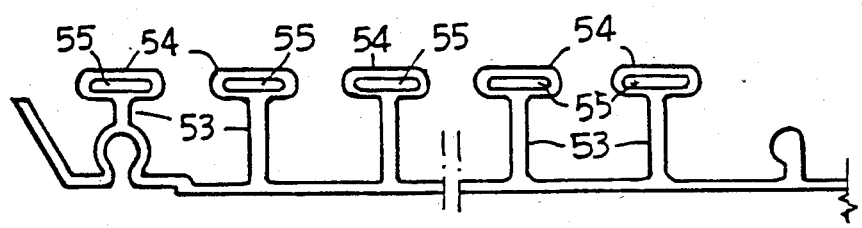
FIG. 8
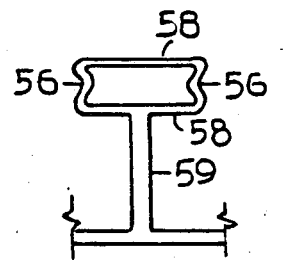 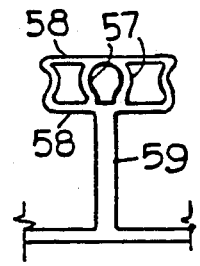 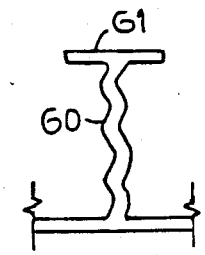
FIG. 9  FIG. 10  FIG. 11

METHOD OF AND MEANS FOR FORMING AND SEALING HELICALLY WOUND TUBES

BACKGROUND OF INVENTION

It has been proposed heretofore to manufacture strips from extruded plastic which strips have had on them a series of transversely positioned upstanding ribs which form between them longitudinal channels, the strip being formed of indefinite length and having at one edge portion a first interengaging member and at another portion either at the opposite edge or inward from the opposite edge a second interengaging member, the arrangement being such that when such a strip is wound in a helical manner with the first enterengaging member locking into the second interengaging member a tubular object is formed which may be of any selected length and is of considerable strength and has many useful purposes such as the formation of pipes which are to be buried in the ground and which then are protected by the helical ribs around the periphery of the pipe.

This invention envisages certain improvements to helically wound structures of this type.

During research the applicants have found that the shape of the transversely positioned upstanding ribs is of importance for a number of reasons, one being to provide maximum protection of a tube so formed by means of the outwardly projecting ribs, another being to provide cushioning means by a selected shape of the ribs, another being to so shape the ribs that better interlocking between adjacent overlapping margins of the strip can be achieved particularly where a fluid seal is required, and these ribs can also be formed to provide added reinforcing by incorporating or being shaped to incorporate reinforcing members, or can be given advantageous shapes when used as sand screens or the like where particles must be prevented from blocking apertures through the wall of the pipe itself, and the present invention relates to various strip formations which achieve the required strengthening and improvement of the pipes formed from such strips.

OBJECTS OF THE INVENTION

An object of the invention is to provide a better means of interengagement of the overlapping portions of the two edge portions of the strip when wound into helical form to supply a firm join without danger of accidental failure.

A further object of the invention is to provide greater impact resistance in such a structure.

A further object is to provide a tube having high impact resistance but a degree of longitudinal flexibility.

A still further object is to use plastic "Memory" to effect a lock.

A further object is to achieve a firm lock with plastics which cannot be solvent or heat welded.

A still further object is to provide a shape which can conventionally be formed into a sand screen or can be used in trickle irrigation or the like.

A still further object is to form a relatively flat continuous surface at the inside of tubes having ribs shaped to give cavities, or for varying the extension capabilities of the structure formed by the strip.

The first object of the invention is related to the marginal sealing of tubes formed of a strip wound to helical form, the edges of the strip overlapping and provided with interengaging means such as a rib on one end and a socket on the other end to interengage during the winding to form a continuous tube, the invention relating particularly to the form of the join at the overlap.

STATEMENT OF INVENTION

The invention consists in a tube formed by helically winding a strip to have overlapping edge portions between convolutions of the strip, and locking the overlapping portions together by a first interengaging member on one face of the strip engaging a mating second interengaging member on the other face of the strip spaced laterally from the first interengaging member, the strip having a series of spaced upstanding longitudinal ribs on at least one face, characterised by a rib forming the first interengaging member having a bulbous end portion, and by a rib having a bulbous mating hollow intermediate its ends opening through the strip to form a socket like second interengaging member, at least the second interengaging member being resilient to receive and hold the bulbous end of the rib forming the first interengaging member whereby limited lateral stretch of the strip at the join is permitted without causing disengagement of the join.

The invention also extends to having other ribs hollow to increase lateral flexibility by allowing expansion or contraction of the strip, and to various shapes of such hollows.

A feature of this invention is the use of flaps to cover the join, or to cover the hollows of the ribs when they open through the strip, these flaps either sealing the hollows or allowing lateral extension or contraction of the strip on the tube formed from it and allowing curvature of the tube.

Thus this invention overcomes the problem of the relative inflexibility of tubes formed by helically winding a strip and joining the contiguous or overlapping ends, and also ensures that the join will seal and will not fail as is possible where the join and the tubes are relatively inflexible. The tube, the subject of this invention, is thus more capable of resisting stress damage when, for instance, used as an underground pipe or conduit or where there is environmental movement relative to the tube.

BRIEF DESCRIPTION OF THE DRAWINGS

FIG. 1 is a perspective view showing portion of a pipe being wound according to this invention, the dotted lines indicating the feed and joining rollers used to form the spirally wound pipe from the ribbon, showing also a few rollers of an array which can be used to guide the first convolution of the strip as the pipe is formed.

FIG. 2 is an enlarged end elevation of portion of a ribbon having the general construction shown in FIG. 1.

FIGS. 5, 6 and 7 show forms of strips with loop-shaped ribs, showing also the loop sealing flaps which need not necessarily be used, FIG. 5 showing the overlap when the strip is wound to helical form.

FIGS. 8, 9 and 10 show "T" shaped ribs with hollow end portions to give resiliency to the perimeter of a tube or pipe formed therefrom, FIG. 11 shows how resiliency can be obtained by corrugating the web of a "T" shaped rib.

DESCRIPTION OF THE PREFERRED EMBODIMENTS

Figure 3:
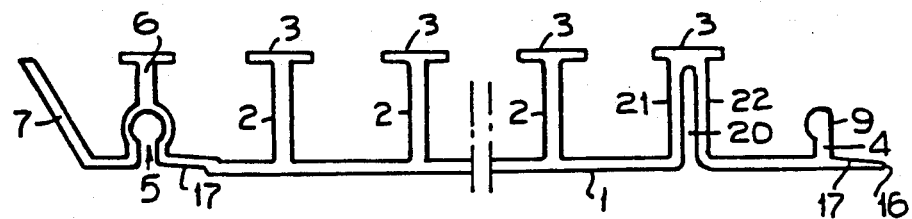
FIG. 3 is a strip with "T" form ribs having locking and sealing members of a preferred form and showing one rib arranged to allow some longitudinal adjustment to take place such as for earth movement in a ground enclosed pipe or to allow some degree of bending.

The construction of the device can be varied, but according to a convenient form the strip 1 has a series of spaced ribs 2 upstanding from the base of the strip with their outer ends 3 of "T" form and the terminal rib 4 along one edge being shorter than the other ribs 2 and shaped to form a first interengaging member to fit into a socket 5 in the rib 6 near the other end of the strip 1, which forms a second interengaging member, the strip 1 however projecting beyond the rib 6 to extend outwards and upwards to form a locking member 7 which engages beneath an adjacent rib as the strip is being wound into a pipe.

The strip 4 has a bulbous end 8 shaped to fit into the socket 5 which has an expanded longitudinal cavity 9 adapted to engage the bulbous end 8 of the rib 4. The rib 4 and the rib 6 are so formed that the bulbous end 8 of the rib 4 can be forced into the socket 5 to cause the bulbous part 8 to engage in the expanded cavity 9 to be held securely therein, which will not be released even if there is limited movement or distortion of the rib 6.

Figure 4:
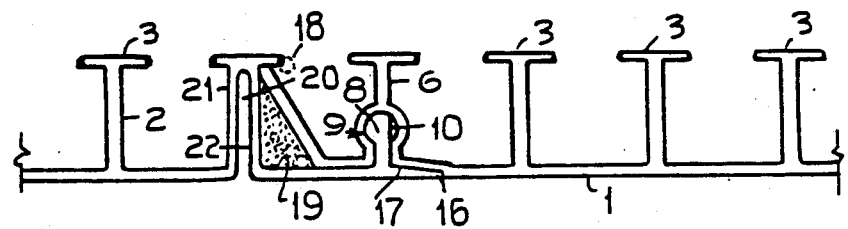
FIG. 4 shows how the edge portions of such a strip interlock when helically wound and seal when helically wound to form a tube or pipe.

The bulbous part 8 of the rib 4 may have a linear flat 10 on the side to define a hollow in the socket as shown more particularly in FIG. 4, this allowing easier engagement but also forms a seal against flow of fluid through the join by forming an expansion and fluid pressure drop system as in a labyrinth seal. The flat is coextensive with the rib and on the side of the rib adjacent the edge of the strip.

The strip 1 during pipe formation is fed forward by a pair of driven rollers 11, and the overlapping edges of the strip as the first convolution is formed are pressed together by a rear joining roller 12 acting in conjunction with a roller 13 on the other side of the strip. Locking together is enhanced by a differential roller 14 which is coextensive with the roller 12 and may be driven at a slightly different speed to the roller 12 to assist in forcing the interengaging members together and assist in curving the strip to form a pipe by inducing stress in the strip.

An array of guide rollers 15, of which only a few are shown, can extend around the first convolution as already known in the art.

It will be seen from FIG. 1 that the rib 4 which forms the first interengaging member, aligns with the socket 5 in the rib 6 which forms the second interengaging member, during the strip formation, and the rollers 12, 13 and 14 force the marginal portion of the strip into locking engagement with the marginal portion at the other end of the strip when helically wound, but at the same time the locking member 7 of the strip is forced beneath the "T" shaped portion 3 of the next upstanding rib 2 to assist the interlock of the two edges of the strip, this being shown particularly in FIG. 4 of the drawings.

The other edge of the strip has a sealing flap 16 which extends to cover the area of interengagement of the ribs 4 and 6 when the strip 1 is wound into a pipe.

The flap 16 lies against the strip 1 and is forced against it by fluid pressure in the pipe or tube and can have the contiguous surface 17 corrugated to form a labyrinth fluid seal. The surface 17 is recessed into the strip 1 and the surface 18 is similarly positioned so that it can lie on the surface of the strip 1 between the rib 4 and the adjacent rib 2 as shown in FIG. 4.

The flap 16 can have a rubber-like sealing surface applied to the surface 17 where it engages the strip 1 after winding, or this portion of the strip at this locality can be of rubber-like plastic coextruded with a rigid profile to provide a highly effective seal, or as an alternative the flap 14 can be cemented to the strip over the join.

With reference to the locking member 7, it will of course be realised that while the rib and socket joint which form the interengaging members can readily be forced together during the mating of the one edge of the strip to the other edge portion of the strip, and while the locking member 7 can readily be located in the space between the locking joint and the next "T" rib, the arrangement of the secondary lock formed by the locking member 7 has to be such that the members can still be interengaged, can lock in position by moving into a locking position in relation to the rib which engages, but a further lock can result when the rib it engages has its projecting end hook shaped as shown at 18 by the dotted lines in FIG. 4, the rib itself being then displaced or distorted to allow the extension locking member 7 to fit into position and when the pressures are released the rib 2 will return to form the secondary lock.

A seal can be formed between the locking member 7 and the rib it engages by inserting a sealant strip 19 as the overlapping edge portions of the strip are being moved into the locking position.

In FIGS. 3 and 4 the body of the strip is similar to that shown in FIGS. 1 and 2 but one rib 2A is shown to have a T-shaped end 3 but formed to have a cavity 20 which allows the flexing referred to earlier and has an effect similar to the limited flexing of the join.

It will be seen that the rib 2A as shown in FIG. 3 is double walled and the cavity formed therebetween is closed at the outstanding end of the rib but opens through the base of the strip 1, but when greater flexing is required the double wall 21 and 22 are spaced apart over most of the length of the rib.

When the cavity 20 is to be sealed, a flap, not shown, which functions similarly to the flap 16, extends from one side of the cavity to engage the strip on the other side of the cavity.

Figure 5:
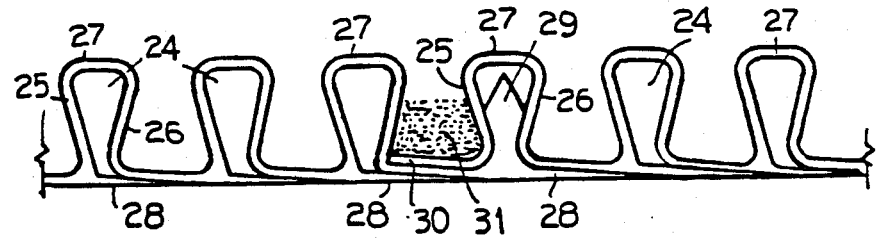
Figure 6:
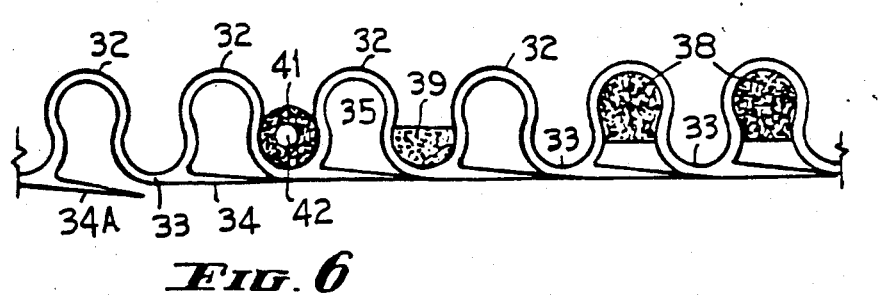

The hollow ribs can be modified in shape and can be as shown in FIGS. 5 and 6.

In FIG. 5 a cavity 24 is formed to give the strip 1 extended longitudinal extension or contraction where this is required. The wall is again double, having members 25 and 26 and a flat top 27. The hollow 24 opens through the strip but is closed by a flap 28.

The flap 28 is prestressed to lie against the base of the strip and while allowing expansion and contraction, gives a smooth internal surface.

The end rib 27A is engaged by the bulbous end 29 of the strip and a locking member 30 is used to limit outward flexing of the wall 25. A sealant 31 can be applied over the locking member as shown.

In the form shown in FIG. 6 the ribs are formed with walls comprising an outer somewhat semicylindrical part 32 joining to inner somewhat cylindrical parts 33 to give as it were a corrugated form and again flaps 34 corresponding to the flaps 28 may be used to seal the cavities 35.

In this figure is shown how the cavities 35 can have inserts of a solid compound or a resilient material, these being designated 38, or alternatively the spaces 39 between the cavities can accommodate reinforcing such as a core 40 or a resilient strip 41 having a tensile core 42.

A sealant strip as 19, shown in FIG. 4, could be used in any of the described forms to provide a further lock to prevent failure of the junctions.

In the form described with reference to FIG. 6 end 37 of the rib has a curved shape so that when this extension is loaded, there is a spring action in the rib itself so that some amount of movement of the outer end of the rib can take place without this movement being transmitted to the inner where the rib joins the strip. This again facilitates locking by distributing the stress in a better manner.

When it is desired to form such a strip into a sand screen or to have similar objects it is only necessary to put a series of saw cuts preferably transversely across curved portions of the strip to penetrate into the channels formed by the cavities because of the curvature of this part of the strip and each channel will then have a multiplicity of slits opening through its base into the object so formed. The flaps which close the inner ends of the ribs can be suitably perforated to allow inflow to the tube or pipe so formed, or the device can act as an irrigation pipe by allowing outflow controlled by the two sets of performations.

This latter form of the invention is schematically illustrated in FIG. 7 in which the ribs are in the form of loops 45 to define longitudinal cavities 46, the lower ends of the loops being closed by the flaps 47, the flap 47A being shown lifted away to shown the extensible or contractible nature of the strip.

Narrow slots 48 are cut at intervals across the ribs 45, and perforations or slits 49 in the projections 47 allow water, from which the sand has been filtered by the slots, to flow into the tube or pipe formed when such a strip is helically wound into a tube.

If it is desired to close the cavities 46, the flaps 47 can be sealed as shown by having the flaps, such as 47B with a bead 51 along its edge adapted to be locked into a longitudinal socket 52.

This form could also be used in irrigation by allowing water to flow through the perforations or slits 49, which can then serve as metering orifices, while the narrow slots 48 serve to distribute the water to the soil.

The strip can also be characterized by having at least some of the ribs having cavities which open through the base of said strip, wherein the cavities are closed by flaps extending from one edge of the cavity to close the cavity. The flaps are secured to the base of the strip at the opposite side of the cavity. Bleed apertures can also be present which are open to the cavities from within a tube formed by the strip and also from outside the tube through the walls of the ribs, whereby the cavities control flow to and from the tube.

In the form shown in FIGS. 8, 9 and 10 the outer ends of the ribs 53 are formed of an impact absorbing shape such as by for instance having the expanded "T" shaped end 54 of the rib remote from the body of the strip formed as a series of hollow members which can either be in the form to define sealed cavities 55, see FIG. 8, or can comprise web-like members 56 extending across the ends of the "T" members 58 extending out from the ribs 59, or the end of the rib can have two inner bowed portions 57, see FIG. 10. The members 53 are impact absorbing in that they have the required springiness.

In FIG. 11 the web 60 of the rib is corrugated and the end 61 of the rib is plain for the purpose of allowing some resiliency to cushion impact which would otherwise be transmitted to the base of the rib itself.

Infill material can be readily injected after the strips are formed, or could be inserted during projection moulding of the strip, and where no extension or contraction of the strip is required the flaps can be sealed in place permanently either during moulding while the material retains sufficient fluidity or afterwards by cementing or forming register means.

When such a strip is wound into helical form it will be realised that the strip itself is in stress because of the upstanding ribs and the general shape of this strip, and this ensures much greater rigidity than is obtainable by articles which are normally of cylindrical form and further, because of the ribs which preferably extend outwardly but could in some cases extend inwardly, or both inwardly and outwardly, not only is a greater strength possible but the cavities could be filled or partly filled with a suitable material as shown in FIG. 6 which will strengthen the structure, or could be a filter material which in the case of the strip with the slits would allow filtering to take place in a highly effective manner by holding a porous material in the channels. Such a filter 50 is shown in one of the cavities of FIG. 7.

Also as will have been realised the construction is such that the ribs can conveniently be shaped with grooves or the like to allow wire or nylon thread or the like to be wound into these grooves to again greatly facilitate reinforing of the structure.

We have found that with the constructions described suitable pipes can be produced for pressure or nonpressure applications such as sewer, telephone conduits and the like but designed to have a deflection factor to withstand earth loading, the pipes for a given linear length of tube being as much as 35% to 40% less in weight and still giving the same deflection factor.

Thus, the extrusion can be regulated to form a strip if required of compound material, which has a greater rigidity to deflection in the direction of the webs than at an angle thereto. Thus, a tube wound from such a strip can have rigid material for at least part of the rib structure but the tube wall itself can be of a more flexible material.

Figure 12:
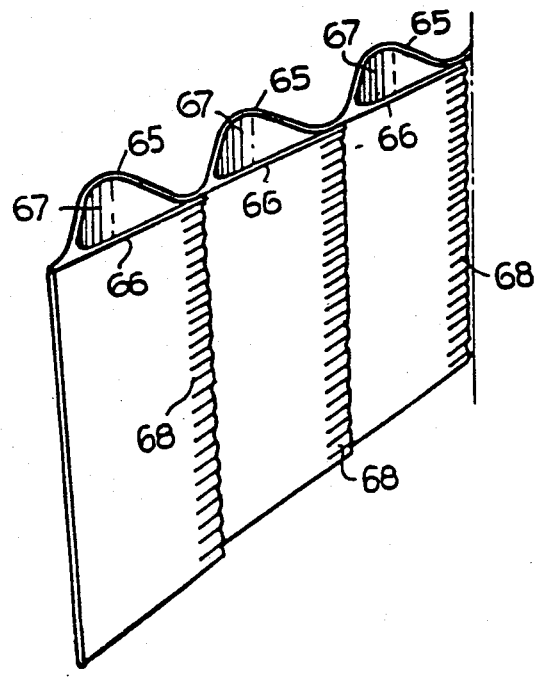
FIG. 12 is a fragmentary perspective view of a tube cut and straightened out to form a drain panel.

In the form shown in FIG. 12 the ribs are in the form of corrugations 65 having the sealing flaps 66 arranged in a manner similar to FIGS. 5, 6, and 7 but the pipe has been longitudinally split and straightened out to form a panel which can be used to drain an earth bank or the like by allowing water seeping into the channels 67 to drain down the channels, the edges 68 of the flaps 66 being corrugated to allow flow from the face formed by the flaps 66 into the channels 67.

To prevent longitudinal slip between adjacent convolutions of the pipe transverse corrugations or saw-tooth ridges and corresponding depressions can be used which may take various forms and can be variously positioned such as the corrugations 70 which undulate the undersurface 71 of the locking member 7 which cooperate with the corrugations 72 on the upper surface of the strip at 73. Equally interengaging ridges could be formed on the bulbous part 8 and in the cavity 9.

The claims defining the invention are claimed as follows:

1. A strip adapted to form a tube by helical winding the strip to have overlapping edge portions and locking the said overlapping edge portions together by a first interengaging member on one face of the strip engaging a second interengaging member on the other face of the strip spaced laterally from the said first member, characterised by a series of ribs positioned longitudinally and upstanding from a base on said strip, cavities in at least some of the said ribs extending longitudinally which open through the base of the said strip, and flaps closing each of the said cavities, said flaps extending from one edge of the cavity it closes and being secured to the base of the said strip at one edge of cavity, said flaps extending over the said cavities to close the said cavities and disengageably contacting the said base at the sides of the said cavities opposite to the attachment to said base.

2. A strip according to claim 1 further characterised by bleed apertures through the wall of the strip to within the said cavities the said apertures allow flow to and from the said cavities.

3. A strip according to claim 1 characterised in that the said upstanding ribs have hollow outer ends whereby to cushion pressures transmitted by the said ribs to the base of the said strip.

4. A strip according to claim 1 further characterised in that each said rib has a longitudinal cavity which opens through the base of the said strip, and each said cavity is closed by a flap extending from one edge of the said cavity to close the said cavity and having its free end secured to the base of the said strip at the opposite side of the said cavity, and by bleed apertures through the wall of the said strip to allow flow into and out of the said cavities.

5. A strip according to claim 4 further characterised in that said bleed apertures open to the said cavities through the walls of the cavities and the said flaps have the free edges corrugated to allow flow to and from the said cavities whereby the said cavities control flow through the said cavities.

6. A strip according to claim 1 characterised in that the said ribs have spaced curved walls to form longitudinal cavities opening through the base of the said strip.

7. A strip according to claim 1 characterised in that the ribs are in the form of corrugations and closed on one side of the strip by flaps having one edge attached to the strip to extend across a corrugation and lie against the opposite edge of that corrugation to form in said strip longitudinal cavities defined between the corrugations and the flaps.

8. A strip according to claim 7 characterised by apertures through the wall of the strip to allow fluid flow into and out of the said hollows formed by the said corrugations.

9. A strip according to claim 7 characterised in that the free ends of the flaps are transversely corrugated.

10. A tube formed by helically winding a strip constructed as defined in claim 1 and having edges of the strip interengaging and held together.

11. A panel formed by a longitudinall corrugated strip constructed as defined in claim 7.

12. A strip according to claim 8 characterised in that the free ends of the flap are transversely corrugated.

13. A tube formed by helically winding a strip constructed as defined in claim 2 and having edges of the strip interengaging and held together.

14. A tube formed by helically winding a strip constructed as defined in claim 3 and having edges of the strip interengaging and held together.

15. A tube formed by helically winding a strip constructed as defined in claim 4 and having edges of the strip interengaging and held together.

16. A tube formed by helically winding a strip constructed as defined in claim 5 and having edges of the strip interengaging and held together.

17. A tube formed by helically winding a strip constructed as defined in claim 6 and having edges of the strip interengaging and held together.

18. A panel formed by a longitudinally corrugated strip constructed as defined in claim 8.

19. A panel formed by a longitudinally corrugated strip constructed as defined in claim 9.

* * * * *